April 7, 1942.  H. L. BLOOD  2,279,221
OFF-SETTING ARRANGEMENT FOR BORING TOOLS AND THE LIKE
Filed June 23, 1939
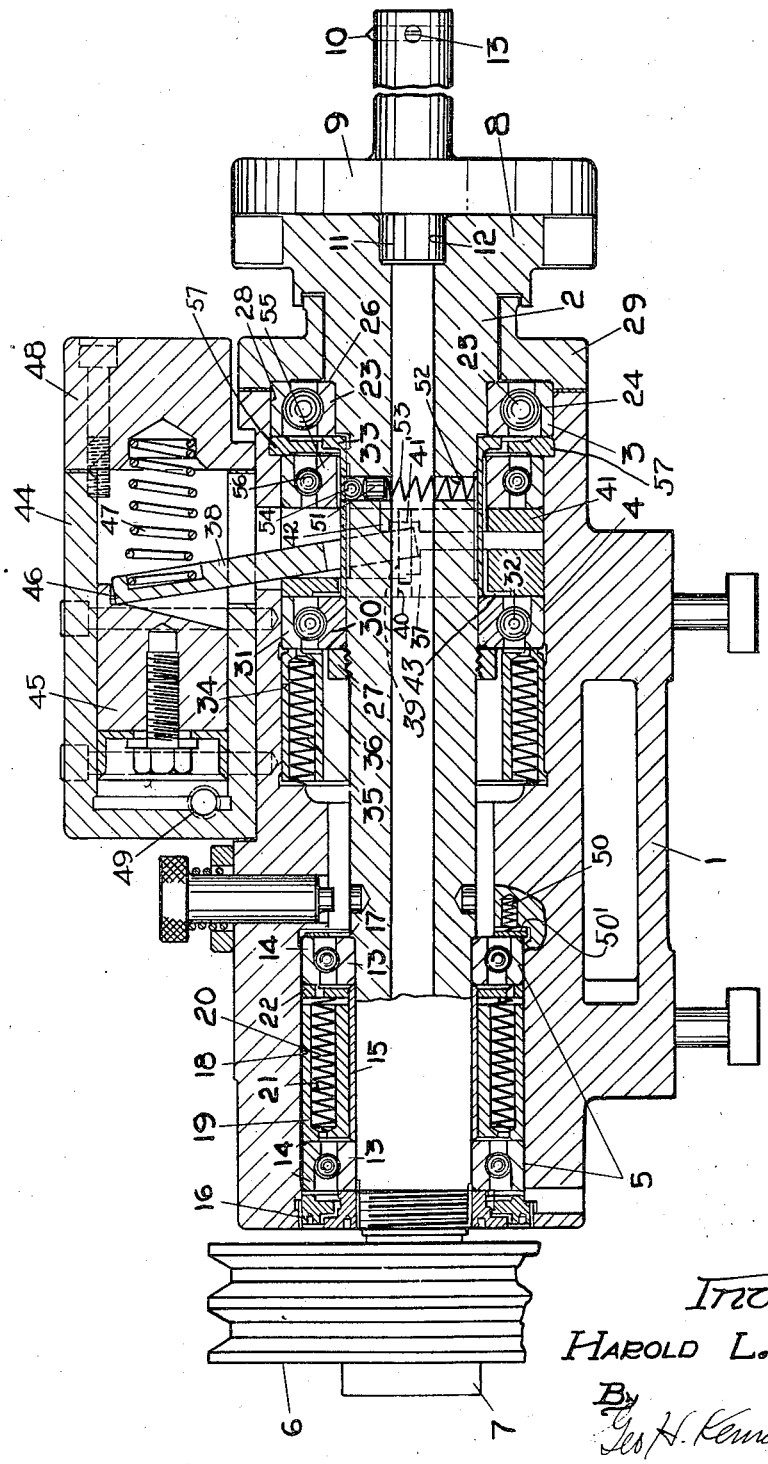
Inventor:
HAROLD L. BLOOD
By Geo. H. Kennedy Jr.
Attorney Patented Apr. 7, 1942

2,279,221

UNITED STATES PATENT OFFICE 2,279,221

OFF-SETTING ARRANGEMENT FOR BORING TOOLS AND THE LIKE

Harold L. Blood, Worcester, Mass., assignor to The Heald Machine Company, Worcester, Mass., a corporation of Massachusetts Application June 23, 1939, Serial No. 280,760

9 Claims. (Cl. 77—58)

The present invention relates to an arrangement by which a rotary tool-carrying spindle, such as used in boring, grinding and like operations, may be offset slightly at the conclusion of such operation, so that upon withdrawal of the tool from the workpiece bore, the tool will be radially spaced from the finished surface of said bore, and will leave no mark or scratch thereon.

In a prior arrangement for this purpose shown by the co-pending companion application of Blood and Anderson, Serial No. 280,761, filed June 23, 1939, the tool spindle is journalled at its end nearest the tool in a ball bearing of such construction and arrangement that upon endwise shifting of said spindle, the holding action or radial restraint imposed normally by said bearing is relieved, thus permitting said spindle to have a slight radial movement under the influence of a spring or the like which acts in such direction as to offset the tool point from the finished surface of the workpiece bore.

The present invention involves the use of similar ball bearings at the tool end of the spindle, but the arrangement is such that a pair of such bearings, in opposed relation are employed, with provision for relieving their holding action or radial restraint by initially shifting one of their race rings, relative to the other race ring of said bearing, by an adequate leverage.

Other and further objects and advantages of the invention will more fully appear from the following detailed description taken in connection with the accompanying drawing, in which the single figure is a sectional view through a tool head embodying the invention.

The boring head shown, as one embodiment of the invention, is intended for use on any of the familiar types of cutting machines, which incorporate a rotary spindle for supporting either the cutting tool or the workpiece. One example of a boring machine to which the head shown is particularly applicable, is disclosed in the Schmidt Patent No. 2,058,359 dated October 20, 1936. In machines of this character, the base has a reciprocable table thereon, on which either the workpiece can be bored or the boring head is mounted, the other of these elements being positioned on a bridge secured to the base of the machine at one end of the table.

Movement of the table procures a relative axial movement between the workpiece and the boring spindle for a boring operation on the workpiece, while the table is moving in one direction, and a retraction of the spindle from within the workpiece bore, when the table is moving in the opposite direction. Prior to reversal of the table movement and after the boring tool has completed its boring action on the workpiece, the rotating boring spindle is stopped, and the mechanism shown in the drawing is rendered operative to procure an offsetting movement between the tool and the finished surface of the workpiece. The mechanism for stopping the spindle rotation is fully described in the Schmidt patent above referred to, and as any mechanism of this character may be utilized in connection with the present invention, such a mechanism will not be described in detail.

Referring to the drawing, my improved boring head has a housing 1 in which a spindle 2 is journalled, preferably by a pair of axially spaced high-angle contact ball bearings 3 and 4 adjacent to the tool end and a pair of similar ball bearings 5 adjacent to the opposite end. The spindle has a driving pulley 6 beyond the bearings 5, secured thereto by a clamping nut 7, a driving connection being provided for the spindle by suitable V belts, not shown. The other end of the spindle has a face plate 8 thereon, and a quill 9 carrying the boring tool 10 is mounted on the face plate, being accurately located by a stud 11 on the quill extending into a bore 12 in the face plate. The boring tool 10 is adjustable laterally in the end of the quill, and is held in position by a clamping screw 13.

The invention resides in an arrangement affording a slight retraction of the boring tool from operative position and this is accomplished at the end of each grinding operation, after the spindle has come to rest, by freeing the spindle from the holding action of the ball bearings 3 and 4 to make possible a slight play of the spindle within its housing. It is essential for this purpose that the portion of the spindle adjacent to the boring tool be temporarily rendered free to move laterally within the housing, although the other end of the spindle adjacent to the pulley need not have this ability to shift laterally. Therefore, the bearings 5 may be of any suitable type which will permit a slight endwise movement of the spindle within the housing without affecting the functioning of these bearings.

As shown in the drawing, the bearings 5 are each of the so-called high-angle contact type having inner races 13 and outer races 14. The inner races are held in spaced relation on the spindle by a sleeve 15 and are clamped against movement on the spindle by a ring 16 threaded on the spindle, which holds the races solidly against a shoulder 17 of said spindle. The outer races 14 are axially slidable in a bore 18 of the housing, thereby permitting a slight endwise movement of the spindle without affecting the operation of the bearings.

The two bearings 5 are placed back to back so that the bearings are pre-loaded by a movement of the outer races 14 away from each other. For pre-loading the bearings 5 a sleeve 19 is positioned between the bearings and is engageable at one end with one of the outer races 14. Coil springs 20 positioned in bores 21 in the sleeve engage with a disk 22, which in turn rests against the other outer race 14. Coil springs 20 thus maintain both of the bearings 5 under the desired pre-load at all times, although permitting the outer races 14 to move axially when the spindle is shifted axially, as will hereinafter appear.

As shown in the drawing, the bearing 3 has an inner race 23 and an outer race 24, between which the balls 25 are arranged. The inner race 23 of bearing 3 and the corresponding race 30 of bearing 4 are held in spaced relation by a bushing 33 surrounding the spindle 2; said parts are secured to the spindle and held from any endwise movement thereon by a ring 27 in threaded engagement with the spindle and bearing against the race 30 to thrust the race 23 against a shoulder 26 of said spindle. The outer race 24 of bearing 3 is held against axial movement within the housing, being positioned in a recess 28 of the housing, and held securely therein by a cap 29 secured to the end of the housing. The bearings 3 and 4 are of the so-called high-angle contact type, in which the contact between the balls and the outer races is located entirely on one side of a plane passing through the centers of the balls; both of said bearings are so designed that a slight relative axial shifting movement between their inner and outer race rings will free the balls to such an extent that there will be a slight amount of lateral or radial play between the race rings. In the arrangement shown, the construction of bearing 3 is such that a movement of the inner race 23 toward the left with respect to the outer race 24, will free the races from the holding action of the balls 25, and thus permit a slight lateral shifting movement of the spindle within the housing.

In the bearing 4, the balls 32 have an outer race 31 in opposed relation to the outer race 24 of bearing 3; but unlike said outer race 24 which is fixed in the housing 1 between cap 29 and ring 57, the outer race 31 is slidable in a bore 34 of the housing and is normally urged to the right for applying a pre-load to both bearings 3 and 4 by springs 35 positioned in a sleeve 36 slidable in the bore 34. The end of the sleeve 36 engages the outer race ring 31 and this ring is accordingly urged constantly toward the right in the drawing, thereby maintaining both bearings 3 and 4 under a normal pre-load.

For temporarily relieving the spindle from the holding action of the bearings 3 and 4, so as to give the spindle the desired slight lateral play, provision is made for moving the outer race 31 of bearing 4 to the left against the force of the springs 35, thereby allowing the spindle to move slightly toward the left and provide for a play in the bearing 3. For the shifting of the race ring 31 the bore 34, in which the outer race ring 31 is slidable, has arranged therein, between the bearings 3 and 4, a member 37 which is notched on opposite sides to receive the lower ends of a bifurcated lever 38. The lever is held in position by pins 39 extending through the opposite ends of the lever and into recesses 40 in the sleeve. These pins project beyond the lever and into the opposite ends of a substantially semi-circular member 41 also arranged in the bore 34. The upper ends of this semi-circular member have a notch 41' with a projecting lug 42 thereabove, this lug acting as a fulcrum for the bifurcated lever when it is rocked clockwise in the drawing.

The member 37 has a recess 43 on the side adjacent to the bearing 4, thereby preventing contact between the sleeve and the inner race ring 30.

The lever is rocked by any suitable means, as for example, a fluid actuated means, including a cylinder 44 mounted on the housing, in which a piston 45 is slidable. The piston has a notch 46 to receive the upper end of the lever and a coil spring 47 normally holds the lever in the position shown, this spring being located between the end of the lever and the cylinder head 48.

When it is desired to have the boring tool retracted from operative position fluid under pressure is directed to the cylinder at the left hand end of the piston through a port 49, thereby moving the piston to the right and swinging the bifurcated lever about the lug 42 to force the member 37 to the left against the outer race 31 of bearing 4; the resulting left hand movement of race 31 relieves the pre-load on bearing 4 and at the same time frees the spindle from the holding action of this bearing, in the manner above described. With the springs 35 thus rendered inoperative, and no longer giving any right hand thrust to the spindle, the latter thereupon comes under the influence of the oppositely-acting lighter springs 50, which are arranged for engagement with a disk 50' resting against the end of the right hand bearing 5, thereby urging the bearings 5 and accordingly the spindle 2, as an entirety, to the left. This left hand spindle movement, shifting the balls 25 of bearing 3, relative to the fixed outer race 24 of said bearing, relieves the spindle of the radial restraint or holding action normally imposed by said balls 25.

When the spindle is thus freed from the holding action of the bearings 3 and 4 so that a lateral shifting movement of the spindle is possible, the spindle is shifted laterally by a plunger 51 positioned in a radial bore 52 in the spindle 2. A coil spring 53 normally urges the piston in a direction parallel to the boring tool, thereby tending to move the spindle in a direction to cause the cutting point of the boring tool to be moved radially inward toward the spindle axis. The plunger engages with a ball 54 which projects through an opening of bushing 33 to engage the inner race ring 55 of a ball bearing 56. The outer race ring of this bearing is arranged in the bore 34 between the semi-circular member 41 and the retaining ring 57 for the outer race ring 24 of the bearing 3.

Boring heads of this general character are usually employed in boring machines that provide a relative axial feed between the tool and the workpiece to perform the boring operation and after the tool has passed entirely over the surface to be bored the tool is withdrawn axially from the workpiece. The reciprocatory table by which this relative feed movement between the tool and work is obtained is frequently actuated by fluid under pressure and thus the means for shifting the spindle axially within the housing may be connected to the fluid pressure system which actuates the table so that upon reversal of the table movement at the end of each boring operation, the spindle, upon being brought to rest, will be automatically shifted axially for the above described back-off or retraction of the tool. Such an arrangement is not essential, however, and it may be desirable to provide other valve means, either manually or automatically controlled for directing fluid under pressure to the spindle shifting means at the desired point at the machine operation.

In operation, the tool head of the present invention has its component parts normally in the position shown, in which all of the bearings 3, 4 and 5 are under the normal pre-load so that the spindle is supported properly within the housing and there is no spindle play. When a retraction of the boring tool is required, fluid under pressure entering the left hand end of the cylinder 48 moves the piston 45 to the right, thereby rocking the bifurcated lever 38 and moving the member 37 to the left, compressing the springs 35, and freeing the spindle from the holding action of bearing 4, as above described; this displacement of springs 35 allows the small springs 50 to impart the desired short movement of the spindle to the left when the outer race ring 31 has been shifted to the left. This left hand spindle movement carries the inner race ring 23 of the bearing 3 to the left relative to the outer ring 24 and thereby frees the spindle from the holding action of bearing 3 as well as the bearing 4. At this time the spring-pressed plunger 51 in the spindle becomes operative to shift the spindle laterally for a retraction of the point of the boring tool. Upon return of the piston 45 to the position shown, the coil springs 35 again restore the bearings to their normal spindle supporting position in readiness for a further use of the boring tool.

I claim:

1. In a device of the class described, a housing, a spindle journalled therein, ball bearings for said spindle, each bearing having an inner and an outer race, resilient means for applying a preload to said bearings, means including a lever for removing the preload to free the spindle from the holding action of the bearings, and means for shifting the spindle lateraly within the housing.

2. In a device of the class described, a housing, a tool-carrying spindle journalled therein, spaced ball bearings for the tool end of said spindle, each bearing having an inner and an outer race, resilient means for urging the outer races toward each other for preloading the bearings, means for relieving the preload on the bearings for freeing the spindle from the holding action of the bearings, whereby a lateral movement of the spindle within the housing is obtained, and means for shifting the spindle laterally of the housing.

3. In a device of the class described, a housing, a tool-carrying spindle journalled therein, spaced ball bearings for the tool end of said spindle, each bearing having an inner and an outer race, resilient means for urging the outer races toward each other for preloading the bearings, means including a lever for urging said outer races apart against the action of the resilient means for relieving the spindle from the holding action of the bearings, and means for shifting the spindle laterally of the housing when freed from the holding action of the bearings.

4. In a device of the class described, a housing, a spindle journalled therein, high angle contact ball bearings for said spindle, means for maintaining an axial preload on at least one of said bearings, means including a lever for relieving said preload, whereby the spindle may move laterally of the housing, and means for shifting said spindle laterally of the housing.

5. In a device of the class described, a housing, a spindle journalled therein, high angle contact ball bearings for said spindle, means for maintaining an axial preload on at least one of said bearings, means including a lever for relieving said preload, whereby the spindle may move laterally of the housing, means for shifting the spindle axially of the housing for freeing the spindle from the holding action of the bearings, and means for shifting the spindle laterally of the housing.

6. In a tool head, a housing, a spindle journalled therein, a tool positioned in the spindle and projecting laterally therefrom, spaced ball bearings for said spindle, each bearing having an inner and outer race, resilient means for urging the outer races axially relative to the inner races for preloading the bearings, means including a lever for urging said outer races in the opposite direction relative to the inner races for relieving the spindle from the holding action of the bearings, and means for shifting the spindle laterally of the housing when freed from the holding action of the bearings in a direction opposite to the projection of the tool.

7. In a tool head, a housing, a spindle journalled therein, a tool positioned in the spindle and projecting laterally therefrom, ball bearings for said spindle, each bearing having an inner and outer race, resilient means for applying a preload to said bearings by urging the outer race axially relative to the inner race, means including a lever for removing the preload to free the spindle from the holding action of the bearings, and means for shifting the spindle laterally within the housing in a direction opposite to the projection of the tool.

8. In mechanism of the class described, a housing, a tool-carrying spindle projecting therefrom, a pair of ball bearings for said spindle in said housing, near the tool end of said spindle, both of said bearings being adapted in response to relative endwise movement of their race rings, to free the spindle from the holding action of their balls, means for normally exerting an axial preload on both bearings to maintain the holding action of their balls, means for shifting a race ring of one bearing to relieve said pre-load and to free the spindle from said bearing's holding action, means rendered effective by relief of said pre-load to shift the spindle endwise, thereby freeing same from the holding action of the other bearing, and means thrusting laterally against the so-freed spindle to cause retraction of its tool from working position.

9. In mechanism of the class described, a housing, a tool-carrying spindle projecting therefrom, a pair of ball bearings for said spindle in said housing, near the tool end of said spindle, both of said bearings being adapted in response to relative endwise movement of their race rings, to free the spindle from the holding action of their balls, means for normally exerting an axial preload on both bearings to maintain the holding action of their balls, means for shifting a race ring of one bearing to relieve said pre-load and to free the spindle from said bearing's holding action, means rendered effective by relief of said pre-load to shift the spindle endwise, thereby freeing same from the holding action of the other bearing, and means thrusting laterally against the so-freed spindle to cause retraction of its tool from working position, ball bearings in said housing for the other end of said spindle, and means for maintaining an axial pre-load thereon, despite removal of the pre-load from the first-mentioned ball bearings.

HAROLD L. BLOOD.